United States Patent [19]

Alloin et al.

[11] Patent Number: 5,393,847
[45] Date of Patent: Feb. 28, 1995

[54] CROSSLINKABLE COPOLYMERS OBTAINED BY POLYCONDENSATION AND IONICALLY CONDUCTIVE MATERIAL CONTAINING THE SAME

[75] Inventors: Fannie Alloin, Grenoble; Michel Armand, Saint-Martin-D'Uriage; Jean-Yves Sanchez, Saint-Ismier, all of France

[73] Assignees: Centre National de la Recherche Scientifique, Paris, France; Hydro-Quebec, Montreal, Canada

[21] Appl. No.: 105,807

[22] Filed: Aug. 13, 1993

[30] Foreign Application Priority Data

Aug. 14, 1992 [FR] France ................. 92 10033

[51] Int. Cl.$^6$ ................................ C08L 71/02
[52] U.S. Cl. ........................ 525/403; 525/404
[58] Field of Search ..................... 525/403, 404

[56] References Cited

U.S. PATENT DOCUMENTS

| | | | |
|---|---|---|---|
| 4,002,689 | 1/1977 | Tomomatsu | 568/616 |
| 4,127,494 | 11/1978 | Lindenberger | 252/77 |
| 5,021,308 | 6/1991 | Armand et al. | 429/194 |
| 5,072,040 | 12/1991 | Armand | 564/82 |
| 5,136,097 | 8/1992 | Armand | 568/28 |
| 5,162,177 | 11/1992 | Armand et al. | 429/194 |

FOREIGN PATENT DOCUMENTS

0445926A2  9/1991  European Pat. Off. .
2164047A   3/1986  United Kingdom .

OTHER PUBLICATIONS

Makromol, Chem, vol. 191 (1990), pp. 397–403, "Kinetic Studies on the Menschutkin Reaction of Dimethylamino-Terminated Poly(oxytetramethylene) with Halides", Kohjiya et al.

Primary Examiner—James J. Seidleck
Assistant Examiner—I. Zemel
Attorney, Agent, or Firm—Oblon, Spivak, McClelland, Maier & Neustadt

[57] ABSTRACT

The invention relates to copolymers, a process for preparing them and their use for the production of ionically conductive materials.

The copolymers consist of identical or different organic blocks A which cannot be crosslinked by a radical route or by a Diels-Alder reaction, each of which has a valency i such that $1 \leq i \leq 6$, and identical or different blocks $Z(CH_2)_j$, in each of which Z denotes an organic radical which has a valency j such that $1 \leq j \leq 6$, the radicals Z additionally containing at least one functional group permitting crosslinking by a radical route or by a Diels-Alder reaction; each block being joined to at least one other block by a functional group Y, the functional group Y being an ether functional group or a secondary or tertiary amine functional group.

They are obtained by polycondensation of HYAYH monomers and $Z(CH_2X)_j$ monomers, wherein Y is a leaving group.

They are useful in the production of ionically conductive materials.

18 Claims, No Drawings

CROSSLINKABLE COPOLYMERS OBTAINED BY POLYCONDENSATION AND IONICALLY CONDUCTIVE MATERIAL CONTAINING THE SAME

The present invention relates to copolymers, to a process for preparing them and to their use for the production of ionically conductive materials.

Polymeric electrolytes obtained by dissolving a salt in a solvating polymer containing heteroatoms are known. Such electrolytes in which the solvent is a polyethylene oxide or an ethylene oxide copolymer are described, for example, in EP-A-13,199 (M. Armand, M. Duclot). These polymeric electrolytes have many applications, in particular in the field of electrochemical generators, light-modulating systems (M. Armand et al., EP-A-253,713), sensors, for example for selective or reference membranes (A. Hammou et al., FR-A-2,601,017 or U.S. Pat. No. 4,923,950).

Polyethylene oxide is a semicrystalline polymer which forms stoichiometric complexes with salts. The conductive amorphous phases of these complexes exist only above a eutectic temperature which is in general between 40° C. and 65° C. depending on the nature of the complexed salts. At normal temperature good conductivities are obtained only with macromolecular systems exhibiting a low or zero crystallinity. Much work has been carried out to improve the conduction properties of these materials. It has resulted, for example, in the formation of copolymers based on ethylene oxide (M. Armand et al., FR-A-2,542,322 or U.S. Pat. No. 4,578,326). Copolymerization of ethylene oxide with other epoxides such as propylene oxide or methyl glycidyl ether appreciably decreases the crystallinity of the material. However, random introduction of defects is reflected in a marked loss in the solvating and dissociating power of the polyethylene oxide uniform block. The preparation of copolymers which have high macromolecular masses, higher than $10^5$, and which have good mechanical properties in the absence of crosslinking, requires reactants of high purity, and reproducible control of the proportions of comonomers which are introduced is difficult because of the difference in reactivity between ethylene oxide and its homologues.

Amorphous polymers which have a good conductivity but mediocre mechanical behavior have been obtained by polycondensation of oligooxyethylene glycols ($M_w \approx 200-1000$) with dichloromethane [C. V. Nicholas, D. J. Wilson, C. Booth & R. J. M. Gilles, Brit. Polym. J. 20 289 (1988)]. In addition, these materials do not contain any reactive functional groups and cannot therefore be crosslinked.

Preparation of networks crosslinked with isocyanates is also known (FR 2,485,274, U.S. Pat. No. 4,357,401, H. Cheradame et al.). However, the introduction of urethane bridges makes these electrolytes reactive, particularly towards lithium.

The objective of the present invention is to provide ionically conductive materials comprising a polymeric solid electrolyte and at the same time exhibiting a good conductivity and a good mechanical behavior.

To this end, the subject of the present invention is a class of crosslinkable copolymers.

Another subject of the invention is a process for the preparation of said copolymers.

Finally, a subject of the invention is ionically conductive materials in which the solvent consists essentially of an abovementioned copolymer.

A copolymer according to the present invention is a crosslinkable copolymer consisting of identical or different organic blocks A which cannot be crosslinked by a radical route or by a Diels-Alder reaction, each of which has a valency i such that $1 \leq i \leq 6$ and identical or different blocks $Z(CH_2)_j$, in each of which Z denotes an organic radical which has a valency j such that $1 \leq j \leq 6$, the radicals Z additionally containing at least one functional group permitting crosslinking by a radical route or by a Diels-Alder reaction;

each block A being joined to at least one block $Z(CH_2)_j$ by a functional group Y and each block $Z(CH_2)_j$ being joined to at least one block A by a functional group Y, the functional group Y being an ether functional group or a secondary or tertiary amine functional group;

the weighted molar mean of valencies i of the blocks A and the weighted molar mean of the valencies j of the radicals Z each being higher than or equal to 2.

The copolymers of the present invention are obtained by a polycondensation reaction in the presence of a base B, of at least one compound $A(YH)_i$ with at least one compound $Z(CH_2H)_j$, A, i, Y, Z and j having the meanings given above, X being a leaving group, the relative proportions of the different compounds $A(YH)_i$ being such that the ratio of the number of radicals Y to the number of blocks A is at least 2, the relative proportions of the different compounds $Z(CH_2X)_j$ being such that the ratio of the number of radicals X to the number of blocks Z is at least 2.

The leaving group X may be a halide, more particularly a chloride, a bromide or an iodide, or else a sulfate $R'OSO_3$ or a sulfonate $R'SO_3$, in which R' denotes an organic group containing fewer than 20 carbon atoms. R' preferably denotes an alkyl group, an aryl group or an alkylaryl group, it being possible for these groups to be optionally halogenated.

In accordance with the present invention a block A is an organic block not capable of being crosslinked by a radical or by a Diels-Alder reaction.

Solvating blocks may be mentioned among the appropriate blocks in the case of A. The solvating blocks may be chosen from homopolymers of ethylene oxide or of propylene oxide. They may also be chosen from copolymers of ethylene oxide and propylene oxide, and copolymers of ethylene oxide or propylene oxide with a comonomer capable of polymerizing by forming ether bonds. The comonomer may be chosen from oxymethylene, oxetane, tetrahydrofuran, methyl glycidyl ether and dioxolane. Among the copolymers very particular preference is given to those containing at least 70 mol % of units derived from ethylene oxide or from propylene oxide.

Nonsolvating blocks may also be mentioned among suitable blocks in the case of A. Such nonsolvating blocks include alkylene radicals, for example those originating from $\alpha,\omega$-alkanediols, arylene radicals, for example those originating from bisphenols, arylalkylene radicals, for example those originating from $\alpha,\alpha'$-xylenediols, and polysiloxane blocks.

Among appropriate radicals in the case of Z there may be mentioned those containing at least one ethylenic double bond. The radical Z may also be chosen from those which have a functional group capable of taking part in a Diels-Alder reaction. Very particularly preferred are radicals Z which have functional groups capable of increasing the reactivity of the leaving groups X of the reactants $Z(CH_2X)_j$ towards nucleophilic substitutions. By way of example there may be mentioned radicals Z in which the carbon atom bonded to the $CH_2X$ group of the reactant $Z(CH_2X)_j$ forms part of an ethylenic double bond, of an aromatic nucleus, of a ketone functional group or of a nitrile functional group, or in which the carbon atom bonded to the $CH_2X$ group of the reactant $Z(CH_2X)_j$ is replaced by a sulfur atom forming part of a sulfone functional group. These particular radicals facilitate the use of the process for preparing the copolymers.

By way of example there may be mentioned the radicals originating from the following compounds $Z(CH_2H)_j$:

derivatives of alkenes, for example of cis-2-butene, of trans-2-butene, of methyl-2-propene and of cis-2,4-hexadiene, which correspond respectively to the following formulae:

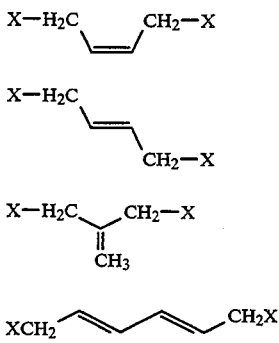

derivatives of styrene, for example of a polymethylstyrene, which correspond to the formula

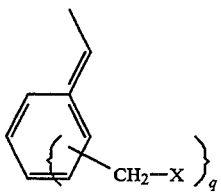

with q=2, 3, 4 or 5, the 2,5-dimethylfuran derivative which corresponds to the formula

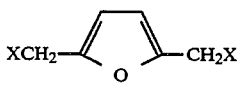

The amine functional group is preferably a functional group NR such that R denotes H or an organic radical containing not more than 30 carbon atoms and chosen from alkyl radicals, aryl radicals, arylalkyl radicals and oxaalkyl radicals. The functional groups NH and $NCH_3$ are particularly preferred.

When Y denotes NH, the reaction of a primary amine group of a compound $A(YH)_i$ with two adjacent $CH_2X$ groups of the same single molecule $Z(CH_2X)_j$ can result in the formation of heterocyclic rings, according to the scheme

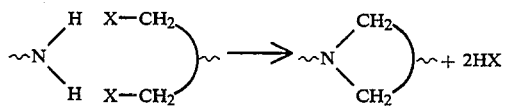

The base B is chosen from alkali or alkaline-earth metal hydroxides, quaternary ammonium hydroxides, in particular anion exchange resins containing benzyltrialkylammonium groups in the form of hydroxide, alkali or alkaline-earth metal hydrides, amides and alkoxides, and nonnucleophilic organic bases which are difficult to quaternize, such as 1,8-bis(dimethylamino)-naphthalene and 1,2,2,6,6-pentamethylpiperidine.

The properties of a copolymer according to the present invention can be predetermined by the choice of the blocks A and/or the radicals Z.

A copolymer according to the present invention may contain blocks A which are all identical. It may also contain different blocks A. The choice of solvating blocks A makes it possible to decrease, or even to eliminate, the crystallinity of the copolymer and therefore to improve its ionic conductivity. It can also improve its mechanical properties. The introduction of nonsolvating blocks makes it possible to adapt some properties of the copolymer, for example its mechanical properties or the conductivity of the network; it also makes it possible to impart new specific properties to the nonsolvating blocks, such as adhesiveness, or to introduce chemical functional groups.

When the copolymer is being prepared, partial substitution of molecules $Z(CH_2X)_j$ with molecules $Z'(CH_2X)_{j'}$, in which Z' is a radical which has the valency j' and which does not have any functional groups reactive towards the radical crosslinking with a given radical initiator, nor any functional groups active in a Diels-Alder reaction, makes it possible to lower the crosslinking node concentration, and therefore constitutes an additional means for controlling the mechanical properties and the conductivity of the crosslinked copolymer. The reactants $Z'(CH_2X)_{j'}$, may be chosen, for example, from the compounds corresponding to the following formulae:

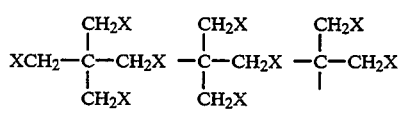

A particularly advantageous class of radicals Z' includes the radicals Z' which have functional groups capable of increasing the reactivity of the leaving groups X in nucleophilic substitutions. Among these radicals there may be mentioned radicals Z' in which the carbon atom bonded to the $CH_2X$ group of the reactant $Z'(CH_2H)_j$ forms part of a hindered double bond, of an aromatic nucleus, of a ketone functional group or of a nitrile functional group, or in which the carbon atom bonded to the $CH_2X$ group of the reactant $Z'(CH_2H)_j$ is replaced by a sulfur atom forming part of a sulfone functional group. These particular radicals include the poly(methylene)arylene radicals such as, for example, α,α'-dichloro-meta-xylene. All the groups X introduced by the coreactants must then be taken into account in the stoichiometry of the reaction.

The copolymers obtained in this particular case, consist of identical or different organic blocks A incapable of being crosslinked by a radical route or by a Diels-Alder reaction, each of which has a valency i such that $1 \leq i \leq 6$, identical or different blocks $Z(CH_2)_j$, in each of which Z denotes an organic radical which has a valency j such that $1 \leq j \leq 6$, the radicals Z additionally containing at least one functional group permitting crosslinking by a radical route or by a Diels-Alder reaction, and identical or different blocks $Z'(CH_2)_{j'}$, in each of which Z' denotes an organic radical which has a valency j' such that $1 \leq j' \leq 6$, the radicals Z' containing no functional group permitting a crosslinking by a radical route or by a Diels-Alder reaction;

each block A being joined to at least one block $Z(CH_2)_j$ or $Z'(CH_2)_{j'}$ by a functional group Y, each block $Z(CH_2)_j$ or $Z'(CH_2)_{j'}$ being joined to at least one block A by a functional group Y, the functional group Y being an ether functional group or a secondary or tertiary amine functional group;

the weighted molar mean of the valencies i of the blocks A and the weighted molar mean of the valencies j and j' of all the radicals Z and Z' each being greater than or equal to 2.

The copolymers of the present invention can be employed as they are or in crosslinked form for the preparation of ionically conductive materials.

The ionically conductive materials of the present invention consist essentially of an easily dissociable salt and a copolymer according to the present invention.

When the degree of polycondensation of the copolymer according to the invention is sufficient the copolymer can be employed as it is for the preparation of an ionically conductive material. However, it is not easy to use.

To prepare ionically conductive materials, it is preferred to employ copolymers which have a relatively low degree of polycondensation, such as those obtained from one or more compounds $A(YH)_i$ and from one or more compounds $Z(CH_2H)_j$ (and optionally from one or more compounds $Z(CH_2X)_j$ in the case of which the weighted molar mean is practically equal to 2 both in the case of i and in the case of j (or j and j', where appropriate). Such copolymers will be crosslinked by virtue of the crosslinkable functional groups present in the blocks Z.

Copolymers containing solvating blocks are preferred for the production of ionically conductive materials. The solvating blocks A consisting of homopolymers of ethylene oxide or propylene oxide or a copolymer of ethylene oxide or propylene oxide and of a comonomer polymerizable by forming ether bonds in which the comonomer represents not more than 30 mol % are particularly preferred. Copolymers of ethylene oxide and of propylene oxide are particularly advantageous.

The salt introduced into the copolymer before crosslinking or into the crosslinked polymer is chosen from the salts usually employed for ionically conductive solid materials. By way of example there may be mentioned the salts $(1/mM)^+X^{3-}$, M denoting an ion of a metal which has the valency m, chosen from alkali metals, alkaline-earth metals, transition metals and the rare earths, or ammonium, amidinium or guanidinium ions, $X^3$ denoting an anion with a delocalized electron charge, for example $Br^-$, $ClO_4^-$, $AsF_6^-$, $R_FSO_3^-$, $(R_FSO_2)_2N^-$ or $(R_FSO_2)_3C^-$, $R_F$ denoting a perfluoroalkyl or perfluoroaryl group, in particular a perfluoroalkyl or perfluoroaryl group containing not more than 8 carbon atoms, particularly $CF_3-$ or $C_2F_5-$.

The salt may also be chosen from the salts corresponding to the formula $(1/nM)^+[(R_FSO_2)_2CY^1]^-$ in which $Y^1$ denotes an electron-withdrawing group chosen from $-C\equiv N$ and the groups $R''Z^1-$ in which $Z^1$ denotes a carbonyl group, a sulfonyl group or a phosphonyl group and R'' denotes a monovalent organic group optionally containing a functional group capable of being crosslinked by a radical route or by a Diels-Alder reaction, M and $R_F$ having the meaning given above. Such compounds can be prepared by reaction of a compound $(1/nM)^+[(R_FSO_2)_2CH]^-$ with a compound $Y^1X^1$ in the presence of a nucleophilic aprotic base Nu, $X^1$ denoting a halogen or a pseudohalogen. Lithium salts are particularly preferred, more especially $(CF_3SO_2)_2N^-Li^+$ and $(CF_3SO_2)_3C^-Li^+$. Mixtures of salts can be employed. These salts and the process for preparing them are described in FR-A-2,683,254, filed on Nov. 8, 1991, to which reference will be made for further details.

The copolymers of the present invention can also be employed for the production of an ionically conductive material comprising a solid solution of one or more salts in a polymer, in which the transport and the mobility of a metal cation $M'^{n+}$ which have the valency n are provided by at least one complex anion corresponding to the general formula $[M'(Z^3)_n(Y^3)_p]^{p-}$, formed between an anionic ligand $(Z^3)^-$, an anionic ligand $(Y^3)^-$ and the cation $M'^{n+}$, with $1 \leq n \leq 5$ and $1 \leq p \leq 3$. The material is then a polymeric complex which can be denoted by the overall formula

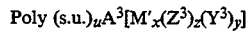

Poly $(s.u.)_u A^3[M'_x(Z^3)_z(Y^3)_y]$ in which $A^3$ is a cation of valency p capable of being easily solvated by the polymer, with $p=1$ or 2;

(s.u.) denotes the solvating unit of the polymer;

u denotes the number of solvating units carried by the macromolecular framework and needed to solvate a cation $A^3$;

x, y and z are such that the relationship $z+y-nx=p$ is satisfied and that they permit the coexistence, in finite quantities, of the complex anion $[M'(Z^3)_n(Y^3)_p]^{p-}$ and of a species chosen from the group consisting of the anion $(Z^3)^-$, the anion $(Y^3)^-$, the complex anion $[M'(Z^3)_n(Y^3)_{p+1}]^{(p+1)-}$, the complex anion $[M'(Z^3)_{n+1}(Y^3)_p]^{(p+1)-}$ and the neutral species $M'(Z^3)_n$.

The ionically conductive materials corresponding to this particular case are described in FR-A-2,673,769, filed on Mar. 7 1991, to which reference will be made for further details. These materials are obtained by a process in which a salt $A^3(Y^3)_p$ and a salt $M'(Z^3)_n$ are dissolved in a copolymer of the present invention, in proportions such that the relationship $z+y-nx=p$ is satisfied and that they permit the coexistence, in finite quantities, of the complex anion $[M'(Z^3)_n(Y^3)_p]^{p-}$ and of a species chosen from the group consisting of the anion $(Z^3)^-$, the anion $(Y^3)^-$, the complex anion $M'(Z^3)_n(Y^3)_{p+1}]^{(p+1)-}$ and the neutral species $M'(Z^3)_n$.

An ionically conductive material of the present invention, in which the copolymer according to the invention is crosslinked, is obtained by subjecting the copolymer to the action of heat or of an energetic radiation such as an ultraviolet radiation, $\gamma$ rays or an electron beam, optionally in the presence of a radical initiator. The radical initiator can be chosen, for example, from benzoyl peroxide, azobisisobutyronitrile (AIBN), azobiscyanovaleric acid, dicumyl peroxide (Dicup) or disulfides, for example 3,3'-dithiodipropionic acid. Benzoyl peroxide is particularly preferred. The radical initiator is not needed when the crosslinking is performed by a Diels-Alder reaction.

In a first embodiment an ionically conductive material is obtained by dissolving the copolymer, the salt, and optionally a radical initiator, in a common solvent. The quantity of initiator which is employed is advantageously from 0.1 to 5% by weight relative to the copolymer. The solvent is chosen from volatile solvents; acetonitrile, tetrahydrofuran and acetone may be mentioned as examples of such a solvent. The viscous solution obtained is degassed and then spread on an appropriate support, for example a sheet of PTFE. After evaporation of the solvent the film obtained is heated for 4 hours to a temperature of between 70° C. and 120° C., depending on the initiator employed.

In another embodiment crosslinking of the copolymer is first of all performed, in the absence of salt, and a membrane is then produced. The salt is then introduced into the membrane in the following manner: a highly concentrated solution of the salt in a volatile polar solvent is produced, it is absorbed by the membrane and the solvent is then evaporated off. The quantity of salt which is introduced is determined by the difference between the initial weight of the membrane and its final weight.

In a third embodiment the crosslinking of a copolymer of the present invention is performed with the aid of a radical polymerization initiator in the presence of a monomer bearing an ionic group and a group which is crosslinkable by a radical route. Perhalogenated sultone derivatives constitute particularly preferred monomers. Such derivatives can be chosen, for example, from those corresponding to the general formula (1) ECFX$^2$—SO$_2$Z$^2$, in which:

E denotes one of the groups R$^1$R$^2$N—CO—, R$^3$—O—CF$_2$— or R$^3$—;

Z$^2$ denotes an ionic group;

X$^2$ denotes F, Cl, H or R$_F$;

the radicals R$^1$, R$^2$ and R$^3$, which are identical or different, are chosen from nonperfluorinated organic radicals containing a functional group which is polymerizable by a radical route;

R$_F$ is chosen from perfluoroalkyl radicals and perfluoroaryl radicals.

The ionic group Z$^2$ is advantageously chosen from $1/mM^{m+}[-O]^-$, $1/mM^{m+}[-NSO_2Q]^-$, $1/mM^{m+}[-CH(SO_2Q)]^-$ and $1/mM^{m+}[-C(SO_2Q)_2]^-$, Q denoting —R$_F$ or —CFX$^2$—E and M$^{m+}$ being as defined above.

When E denotes a group R$^1$R$^2$N—CO—, the monomers (1) can be prepared by reaction of a sulfonylacetic acid fluoride F—COCFX$^2$—SO$_2$F with an amine R$^1$R$^2$NH in the presence of a base.

When E denotes a group R$^3$—O—CF$_2$—, the monomers (1) can be obtained from the sulfonylacetic acid fluoride by a three-stage process: reaction of the sulfonylacetic acid fluoride with a fluoride; bringing the perfluoroalkoxide obtained into contact with a reactant R$^3$Y$^2$ to obtain the compound R$^3$O—CF—CFX—SO$_2$F; reaction of this compound with the appropriate reactant to replace the fluorine in the SO$_2$F group with an ionic group chosen from $1/mM^{m+}[-O]^-$, $1mM^{m+}[-NSO_2R]^-$, $1/mM^{m+}[-CH(SO_2R_F)]^-$ or $1/mM^{m+}[-C(SO_2R_F)_1]^-$.

When the group E is R$^3$—, the monomers (1) are obtained from the sulfonylacetic acid fluoride by a three-stage process. During a first stage the sulfonylacetic acid fluoride is treated with water, this resulting in a hydrolysis followed by a decarboxylation. The compound obtained has a proton exhibiting an acidic character on the α carbon, making possible the formation of a carbanion which, during a second stage, gives rise to a nucleophilic substitution reaction in the presence of a base. During a third stage the compound obtained is reacted with the appropriate reactant to replace the fluorine of the SO$_2$F group with an ionic group. Such monomers are described in FR-A-2,687,671, filed on Feb. 21 1992, to which reference will be made for further details.

The ionically conductive materials of the present invention may, of course, additionally contain additives which are usually employed in ionically conductive materials, such as plasticizers and stabilizers, depending on the required final properties.

The ionically conductive materials of the present invention can be easily prepared and are easy to use as a result of the low total molecular mass.

The ionically conductive materials of the present invention can be employed as a polymeric solid electrolyte in an electrochemical cell. An electrochemical cell according to the invention comprises a negative electrode and a positive electrode which are separated by an electrolyte consisting essentially of a copolymer according to the invention and an easily dissociable salt.

The ionically conductive materials of the present invention are also useful for the production of an electrochemical generator, rechargeable or otherwise. Such a generator comprises a negative electrode and a positive electrode which are separated by an electrolyte consisting essentially of a copolymer according to the invention and an easily dissociable salt.

The ionically conductive materials of the present invention are also useful in other electrochemical systems such as light-modulating systems, for example electrochromic systems, for the production of selective membranes or reference membranes in sensors, and for the production of supercapacities.

The present invention is illustrated by the following examples, given by way of illustration without any limitation being implied.

EXAMPLE 1

20 g of poly(oxyethylene) glycol of mass 2000 (marketed by Aldrich under reference 29,590-6) and 2.4 g of finely ground sodium hydroxide were introduced into a three-necked round bottom flask fitted with a mechanical stirrer bearing, an argon delivery and a dropping funnel. The mixture was heated to 45° C. with vigorous mechanical stirring. After a viscous mixture was obtained 1.25 g (10$^{-2}$ mol) of 3-chloro-2-chloromethyl-1-propene were added slowly. After 8 hours' reaction the product was taken up in CH$_2$Cl$_2$ and the inorganic precipitate was separated off by filtration. After evaporation of the solvent a viscous liquid was obtained. The molecular masses, given by steric exclusion chromatography analysis are: Mw=69,000 and Mn=27,000, as polystyrene equivalent.

5 g of this polymer were then dissolved in acetonitrile and 2.49 g of lithium trifluorosulfonylimide (LiTFSI) were added to this solution, the O/Li ratio being 8, together with 0.1 g of benzoyl peroxide. After degassing and casting of the solution, the acetonitrile was evaporated off in the oven and then the membrane obtained was kept at 70° C. for 3 hours under an argon atmosphere to complete the crosslinking. Investigation using impedance spectrometry (DSC) gives a value of $3 \times 10^{-6}$ S/cm at 25° C. and of $2 \times 10^{-4}$ S/cm at 65° C. Washing with $CH_2Cl_2$, followed by a Soxhlet extraction with the same solvent shows that 91% of the polymer is crosslinked.

EXAMPLE 2

5 g of poly(oxyethylene) glycol of mass 1000 (marketed by Aldrich under reference 20,242-8) and 0.57 g of 3-chloro-2-chloromethyl-1-propene were introduced into a two-necked round bottom flask fitted with a mechanical stirrer bearing and a dropping funnel. The mixture was heated to 40° C. with vigorous mechanical stirring and 1.35 g of finely ground potassium hydroxide were then added. After 16 hours' reaction the product was taken up in THF and filtered to remove the remaining KOH and the KCl formed. After evaporation of the solvent the product was taken up in water. The remaining traces of KOH were removed with a Dowex 50X2 acidic resin (marketed by Dow Chemical) until a neutral pH was obtained. The water was then evaporated off. The molecular masses, given by steric exclusion chromatography analysis are: Mw=103,000 and Mn=46,000, as polystyrene equivalent.

2 g of this polymer were then dissolved in acetonitrile and 0.41 g of lithium trifluorosulfonylimide (LiTFSI) were added to this solution, the O/Li ratio being 30, together with 0.04 g of benzoyl peroxide to crosslink the double bonds. After degassing and casting of the solution, the acetonitrile was evaporated off in the oven and the membrane obtained was then kept at 70° C. for 3 hours to complete the crosslinking. An investigation using impedance spectrometry gives a value of $10^{-5}$ S/cm at 25° C. and of $2 \times 10^{-4}$ S/cm at 65° C. A DSC investigation has shown that the crosslinked polymer has a glass transition temperature of $-56°$ C. and a melting temperature of 21.3° C. in the absence of salt. At a salt concentration corresponding to O/Li=30 the polymer exhibits a glass transition temperature of $-52.1°$ C. and a melting temperature of 10.6° C.

EXAMPLE 3

2 g of the polymer obtained after polycondensation in Example 2, 0.75 g of salt $CH_2=CH-CH_2-O-CF_2-CF_2-SO_3Li$ (for O/Li=14) and 0.03 g of benzoyl peroxide were dissolved in acetonitrile. The operating method of Example 2 was repeated to prepare a membrane. A Soxhlet extraction with methanol showed that 80% of the salt was bound to the polymer. An investigation by impedance spectroscopy gave a value of $2 \times 10^{-7}$ S/cm at 20° C. and of $10^{-5}$ S/cm at 50° C.

EXAMPLE 4

5 g of poly(oxyethylene)diamine (Jeffamine ED900 marketed by Texaco Chemicals) and 0.66 g of 3-chloro-2-chloromethyl-1-propene were introduced into a two-necked round bottom flask fitted with a mechanical stirrer bearing. The mixture was heated to 40° C. with vigorous mechanical stirring and 3 g of basic resin (marketed by Dow Chemicals under reference Dowex 1X8-50) were then added. After 10 hours' reaction a viscous polymer was obtained and was dissolved in THF. The solution was filtered to remove the resin and the THF was then removed by evaporation. The molecular masses, given by steric exclusion chromatography analysis, are: Mw=32,000 and Mn=14,000, as polystyrene equivalent.

1 g of this polymer was then dissolved in acetonitrile and 0.34 g of lithium trifluorosulfonylimide (LiTFSI) were then added to this solution, the O/Li ratio being 14, together with 0.06 g of benzoyl peroxide. After degassing and casting of the solution the acetonitrile was evaporated off in the oven and the membrane obtained was then kept at 70° C. for 3 hours to complete the crosslinking. Investigation by impedance spectrometry gives a value of $5 \times 10^{-6}$ S/cm at 25° C.

EXAMPLE 5

5 g of poly(oxypropylene) glycol of mass 1025 (marketed by Aldrich under reference 20,232-0) and 0.42 $cm^3$ of 3-chloro-2-chloromethyl-1-propene were introduced into a two-necked round bottom flask fitted with a mechanical stirrer bearing. The mixture was heated to 40° C. with vigorous mechanical stirring and 1.3 g of finely ground potassium hydroxide was then added. After 10 hours' reaction the product was dissolved in water. The aqueous solution was filtered through ultrafiltration cells (cutoff threshold 1000) to remove the remaining KOH and the KCl formed. The water was then evaporated off. The molecular masses, given by steric exclusion chromatography analysis, are: (Mw according to 200–1000 A columns)=55,000 and (Mn according to 200–1000 A columns)=23,000, as polystyrene equivalent.

2 g of this polymer were then dissolved in acetonitrile and 0.04 g of benzoyl peroxide was then added to this solution to crosslink the double bonds. After degassing and casting of the solution the acetonitrile was evaporated off in the oven and the membrane obtained was then kept at 70° C. for 2 hours to complete the crosslinking. Investigation by impedance spectrometry gives a value of $2 \times 10^{-6}$ S/cm at 25° C. and of $10^{-4}$ S/cm at 65° C.

EXAMPLE 6

2 g of poly(oxyethylene)diol of mass 400 (POE 400) (marketed by Aldrich under reference 20,239-8), 5 g of poly(oxyethylene)diol of mass 1000 (POE 1000) (marketed by Aldrich under reference 20,242-8) and 1.24 g of 3-chloro-2-chloromethyl-1-propene were introduced into a two-necked round bottom flask fitted with a mechanical stirrer bearing. The mixture was heated to 40° C. with vigorous mechanical stirring and 3 g of finely ground potassium hydroxide were then added. After 10 hours' reaction a product was obtained, of mass Mw=72,000 and Mn=34,000, as polystyrene equivalent. The product was dissolved in THF to remove the remaining KOH and the KCl formed. After evaporation of the THF the product was dissolved in water and the remaining KOH was neutralized by adding an Amberlite IR118 acidic resin marketed by Rohm & Haas. The mixture was then filtered to remove the resin, the water was distilled off and drying was completed in a vacuum desiccator at 50° C. for 48 hours.

The polymer obtained has a melting temperature $T_m=12.7°$ C., intermediate between the melting temperature of POE 1000 and that of POE 400. This low melting temperature makes it possible to obtain polymer-salt complexes which are amorphous even at low salt concentrations.

EXAMPLE 7

13 g of polytetrahydrofurandiol of mass 650 (marketed by Aldrich under reference 34,528-8) were intimately mixed with 6.7 g of KOH and the mixture was heated to 45° C. The viscous mixture obtained was stirred mechanically and 2.5 g of 1-chloro-2-chloromethylpropene were added to it. The reaction mixture was then kept at 60° C. for 15 hours and then returned to ambient temperature. The addition of 200 ml of dichloromethane resulted in the precipitation of KOH and KCl, which was removed by filtration on a porosity 4 filter crucible. The organic phase placed in a separating funnel was washed successively with aqueous solutions of dilute acid and then with demineralized water until a neutral pH was obtained. It was then dried over magnesium sulfate and then, after filtration, the solvent was stripped off in the rotary evaporator. To remove, using azeotropic distillation, the small quantities of water trapped by the polymer, toluene was added repeatedly and was stripped off in the rotary evaporator. 13.2 g of product were thus recovered, corresponding to a yield of approximately 95%. The masses given by steric exclusion chromatography analysis are $Mw=32,000$ and $Mn=15,000$, as polystyrene equivalent.

1.08 g of the polymer obtained were dissolved in 5 ml of THF and 215 mg of LiTFSI were added to obtain an O/Li ratio of 20, together with 30 mg of benzoyl peroxide. After casting of the viscous solution in similar conditions to those of Example 2 and evaporation of the THF the film obtained was heated to 70° C. for 5 hours. The flexible membrane obtained is slightly colored and exhibits good mechanical properties. Its conductivity is $2\times10^{-6}$ S/cm at 25° C. and $2\times10^{-4}$ S/cm at 70° C. The Arrhenius plot log $\sigma=f(1/T)$ shows a behavior of free volume type from the ambient temperature onwards, which indicates an amorphous nature of the polymer/salt complex.

EXAMPLE 8

7.8 g of finely ground KOH and 5 g of 3-chloro-2-chloromethyl-1-propene were added to a mixture of 10 g of poly(oxyethylene) glycol of mass 1000 and 1.2 g of 1,6-hexanediol. The mixture was heated to 70° C. in a three-necked round bottom flask fitted with mechanical stirring, a reflux condenser and an argon delivery. Analysis of the reaction mixture after 24 hours' reaction, carried out by steric exclusion chromatography performed on two Ultrastyragel 100 A columns - a technique which allows good separation of the oligomers and of monomers [cf. J. Y. Sanchez et al., Analysis, 18,577-81 (1990)] shows the complete consumption of the polyethylene glycol and of approximately 85% of the hexanediol. After a treatment which is identical with that of Example 7, mass analysis gives $Mw=22,000$ and $Mn=9,600$.

0.83 g of LiTFSI and 32 mg of benzoyl peroxide were added to a solution of 2.12 g of this polycondensate in 15 ml of acetonitrile. After film casting, degassing and evaporation of the solvent, the film was heated to 70° C. and kept at this temperature for 4 hours. The membrane obtained has a conductivity of $8\times10^{-7}$ S/cm at 20° C. and of $4\times10^{-5}$ S/cm at 60° C.

EXAMPLE 9

A mixture of 2 g of poly(oxyethylene) glycol 400 (PEG400) (marketed by Aldrich under reference 20,239-8), 1.08 g of trans-1,4-dibromo-2-butene and 1.2 g of KOH was heated to 60° C. and kept at this temperature for 20 hours. Analysis by vapor phase chromatography showed the complete disappearance of the dibromo compound from the crude reaction mixture. After dissolving in THF and removing inorganic products by filtration, analysis of the copolymer by steric exclusion chromatography gave the following masses: $Mw=20,000$ and $Mn=11,000$, as polystyrene equivalent.

Crosslinking tests were performed at 70° C. with benzoyl peroxide for several hours. The insolubles content determined is 20% and analysis by infrared with Fourier transform confirms the low degree of consumption of the double bonds.

EXAMPLE 10

The operating method of Example 9 was reproduced, half of the trans-1,4-dibromo-2-butene being replaced with 3-chloro-2-chloromethyl-1-propene.

0.54 g of trans-1,4-dibromo-2-butene ($2.5\times10^{-3}$ moles) and 0.31 g of 3-chloro-2-chloromethyl-1-propene ($2.5\times10^{-3}$ moles) were added to 2 g of PEG 400, followed by 1.2 g of finely ground KOH. The reaction mixture was stirred mechanically for 15 hours at 60° C. An analysis by vapor phase chromatography showed that it then no longer contained any dichloro derivative or dibromo derivative. The product obtained, isolated by the operating method of Example 9, exhibits characteristics which are close to those of the product of Example 9: $Mw=23,000$, $Mn=10,500$.

The polycondensate was crosslinked with the aid of benzoyl peroxide at 70° C. for 4 hours. Soxhlet extraction reveals an insolubles content close to 90%. In the temperature range from 193 K to 423 K DSC analysis of the network does not make it possible to detect any recrystallization peaks or melting peaks which would be the evidence for a crystallinity. The conductivity of a membrane prepared in conditions which are similar to those of the preceding examples with an O/Li ratio of 20 is $4\times10^{-5}$ S/cm at 25° C. and $10^{-3}$ S/cm at 65° C.

The choice of the relative proportions of trans1,4-dibromo-2-butene and of 3-chloro-2-chloromethyl-1-propene thus makes it possible to adjust the degree of crosslinking of the final crosslinked copolymer.

EXAMPLE 11

1,6-Dihydroxy-2,4-hexadiene was prepared by reduction of trans,trans-muconic acid (marketed by Aldrich under reference M9000-3) with the borane-THF complex. The diol thus obtained was converted into a halogen derivative ($ClCH_2CH=CH-)_2$ by treatment with thionyl chloride $SOCl_2$ and purified by distillation at reduced pressure. 8 g of poly(oxyethylene) glycol of mass 1500 (marketed by Aldrich under reference 20243-6), 0.82 g of 1,6-dichloro-2,4-hexadiene and 5 ml of THF were introduced into a two-necked round bottom flask fitted with a mechanical stirrer bearing and a dropping funnel. The mixture was heated to 40° C. with vigorous mechanical stirring and 1 g of finely ground commercial potassium hydroxide (containing 85% of KOH) was then added. After 16 hours' reaction the product was diluted in THF, and filtered to remove the remaining KOH and the KCl formed. After evaporation of the THF, the product was taken up in water and the remaining KOH was neutralized by adding a Dowex 50X2 acidic resin marketed by Dow Chemical. The water was then evaporated off.

2 g of the polymer obtained were then dissolved in acetonitrile and 0.04 g of benzoyl peroxide and 0.56 g of LiTFSI (O/Li=30/1) were then added to this solution. After degassing and casting of the solution, the acetonitrile was evaporated in the oven and the membrane obtained was then kept at 70° C. for 3 hours under a stream of argon to complete the crosslinking. Investigation by impedance spectrometry gives a value of $1.2 \times 10^{-5}$ S/cm at 25° C.

EXAMPLE 12

2,4-Bis(chloromethyl)styrene was prepared by passing a stream of anhydrous hydrogen chloride through a mixture of styrene and dimethoxymethane maintained at 40° C. The compound $CH_2=CH\Phi(CH_2Cl)_2$ was purified by distillation. A polymerization by polycondensation was obtained by reacting, under the conditions of Example 11, 30 g of a co(polyoxyethylene-polyoxypropylene)diol of mass 3500 and containing 15 mol % of units derived from propylene oxide, diluted in 20 ml of THF, 1.75 g of 2,4-bis(chloromethyl)styrene, and 1.5 g of ground commercial potassium hydroxide (85% of KOH). After 12 hours' reaction at 0° C. the polymer obtained was purified under the conditions of Example 11.

A membrane was prepared by dissolving 5 g of polymer, 0.55 g of lithium perchlorate and 0.08 g of azobiscyanovaleric acid in 5 ml of acetone. The mixture was spread to form a 100 μm layer on a sheet of glass on which 300 nm of a doped indium oxide (ITO), followed by 100 nm of tungsten oxide $WO_3$, were deposited by cathodic sputtering. The acetone was evaporated off. Another sheet of glass covered with ITO and with 200 nm of a mixed lithium cerium titanium oxide, of composition $Li_{0.5}CeTiO_4$, was placed above the first and kept at a distance of 50 μm using shims, and then heated to 70° C. under a stream of argon for 3 hours to obtain the crosslinking of the polymer. This assembly, the leak-proofing of which was produced by sealing the two sheets with an epoxy-type resin, forms an electrochromic device whose operation is provided by the application of a voltage of 1.5 V. When the - pole is connected to the tungsten oxide electrode, the system is blue in color. Reversal of the polarity restores the colorless state.

EXAMPLE 13

A crosslinkable polymer of branched structure was prepared by polycondensation of a mixture of trifunctional blocks and of monofunctional blocks.

6 g of poly(oxyethylene)triol (POE triol) of mass 2000, marketed by the company Dai-Ichi Kogyo Seiyaku, 1.8 g of polyethylene glycol monomethyl ether of mass 600 and 0.75 g of 3-chloro-2-chloromethyl-1-propene were introduced into a two-necked round bottom flask fitted with a mechanical stirrer bearing. The mixture was heated to 45° C. with vigorous mechanical stirring and 10 ml of THF and 1.8 g of finely ground commercial potassium hydroxide were then added. After 10 hours' reaction the product was dissolved in water. The aqueous solution was filtered through ultrafiltration cells (cutoff threshold 5000) to remove the remaining KOH and the KCl formed. The water was then evaporated off.

A membrane was formed with the polymer obtained and the salt LiTFSI (O/Li=18/1) and was crosslinked with benzoyl peroxide. The ionic conductivity obtained is $4 \times 10^{-5}$ S/cm at 25° C.

Similar conductivity properties were obtained by employing a POE tetrol prepared by anionic polymerization of ethylene oxide starting with pentaerythritol. In this case the molar ratio of the mono- to tetrafunctional blocks was 2/1 to obtain a mean hydroxyl group functionality of 2.

EXAMPLE 14

500 g of poly(ethylene glycol) of mass 600 and 200 ml of THF were introduced into a reactor. 21 g of 3-chloro-2-chloromethyl-1-propene (marketed by Aldrich under reference C3,110-4) and 116 g of $\alpha,\alpha'$-dichloro-meta-xylene (marketed by Aldrich under reference 10,598-8) were added. After homogenizing the mixture, 150 g of sodium hydroxide ground to a particle size of ≦50 μm were dispersed in it by mechanical stirring and the temperature was raised to 50° C. After 10 hours the polymer was separated off and purified by the operating method of Example 11. After incorporation of LiTFSI (O/Li =24/1) and crosslinking, an elastic and adhesive material was obtained in which the density of crosslinking nodes is reduced to 0.26 mol/kg and whose conductivity attains $2 \times 10^{-5}$ S/cm at 20° C.

Similar results were obtained by reproducing the operating method of Example 14, the $\alpha,\alpha'$-dichlorometaxylene being replaced with dichloromethane.

EXAMPLE 15

A coupling agent, 2,5-bis(toluenesulfonylmethyl)furan, is obtained by reaction of an equimolecular mixture of toluenesulfonyl chloride and 2,6-dimethylpyridine with 2,5-furandimethanol (marketed by Aldrich under reference 19,461-1).

2.2 g of the abovementioned coupling agent and 0.8 g of finely ground commercial potassium hydroxide (85% of KOH) were added to 10 g of poly(ethylene glycol) of mass 2000 and 5 ml of THF. After 16 hours' reaction the product was diluted in THF and filtered to remove excess KOH and $KCH_3\Phi SO_3$ formed by the polycondensation reaction. The solvent was evaporated off and the product was taken up in water and washed by ultrafiltration (cutoff M≧5000). The polymer obtained can be spontaneously crosslinked after incorporation of LiTFSI (O/Li=14/1) by heating to 180° C. for 10 minutes.

EXAMPLE 16

0.5 g of 1,6-hexanediol and 0.4 $cm^3$ of 3-chloro-2-chloromethyl-1-propene were introduced into a two-necked round bottom flask fitted with a mechanical stirrer bearing. The mixture was heated to 40° C. with vigorous mechanical stirring and 1.2 g of finely ground potassium hydroxide were then added. After 8 hours' reaction the product was dissolved in THF. The solution was filtered to remove the inorganic salts (KOH and KCl). The THF was removed. The product was then taken up in water and neutralized with the aid of a Dowex 50X2 acidic resin marketed by Dow Chemical. The resin was removed by filtration and the water by evaporation. Molecular masses given by steric exclusion chromatography analysis are: Mn =2500 and Mw=4000, as polystyrene equivalent.

We claim:

1. Crosslinkable copolymer consisting of identical or different organic blocks A which cannot be crosslinked by a radical route or by a Diels-Alder reaction, each of which has a valency i such that $1 \leq i \leq 6$ and identical or different blocks $Z(CH_2)_j$, in each of which Z denotes an organic radical which has a valency j such that $1 \leq j \leq 6$, the radicals Z additionally containing at least one functional group permitting crosslinking by a radical route or by a Diels-Alder reaction;

each block A being joined to at least one block $Z(CH_2)_j$ by a functional group Y and each block $Z(CH_2)_j$ being joined to at least one block A by a functional group Y, the functional group Y being an ether functional group or a secondary or tertiary amine functional group;

the weighted molar mean of i and the weighted molar mean of j each being higher than or equal to 2.

2. Copolymer according to claim 1, characterized in that the amine functional group is a functional group NR such that R denotes a hydrogen atom or an organic radical containing not more than 30 carbon atoms and chosen from alkyl radicals, aryl radicals, arylalkyl radicals and oxaalkyl radicals.

3. Copolymer according to claim 1, characterized in that at least a proportion of the blocks A are solvating blocks.

4. Copolymer according to claim 3, characterized in that the solvating blocks are chosen from homopolymers of ethylene oxide or of propylene oxide, copolymers of ethylene oxide and of propylene oxide, and copolymers of ethylene oxide or propylene oxide with a comonomer polymerizable by forming ether bonds.

5. Copolymer according to claim 4, characterized in that the comonomer polymerizable by forming ether bonds is chosen from oxymethylene, oxetane, tetrahydrofuran, methyl glycidyl ether and dioxolane.

6. Copolymer according to claim 1, characterized in that at least a proportion of blocks A are nonsolvating blocks.

7. Copolymer according to claim 6, characterized in that the nonsolvating blocks are chosen from alkylene radicals, arylene radicals, arylalkylene radicals and polysiloxane blocks.

8. Copolymer according to claim 1, characterized in that the radicals Z have an ethylenic double bond or a functional group capable of being involved in a Diels-Alder reaction.

9. Copolymer according to claim 1, characterized in that the radical Z is chosen from the radicals Z in which the carbon atom bonded to the $CH_2$ group of the block $Z(CH_2)_j$ forms part of a double bond, of an aromatic nucleus, of a ketone functional group or, of a nitrile functional group, or in which the carbon atom bonded to the $CH_2$ group of the block $Z(CH_2)_j$ is replaced by a sulfur atom forming part of a sulfone functional group.

10. Copolymer according to claim 1, characterized in that a proportion of the blocks $Z(CH_2)_j$ is replaced by blocks $Z'(CH_2)_j$, in which Z' is a radical which has the valency j' and which does not have any bonds reactive towards radical crosslinking with a given radical initiator, the weighted molar mean of the combination j and j' being higher than or equal to 2.

11. Copolymer according to claim 10, characterized in that the radical Z' is chosen from the radicals Z' in which the carbon atom bonded to the $CH_2$ group of the block $Z'(CH_2)_j$, forms part of a hindered double bond, of an aromatic nucleus, of a ketone functional group or, of a nitrile functional group, or in which the carbon atom bonded to the $CH_2$ group of the block $Z'(CH_2X)_j$, is replaced by a sulfur atom forming part of a sulfone functional group.

12. Copolymer according to claim 11, characterized in that the radicals Z' are chosen from poly(methylene)arylene radicals.

13. Process for the preparation of a copolymer according to claim 1, characterized in that it consists in performing a polycondensation reaction in the presence of a base B, of at least one compound $A(YH)_i$ with at least one compound $Z(CH_2X)_j$, A, i, Y, Z and j having the meanings given above, X being a leaving group, the relative proportions of the different compounds $A(YH)_i$ being such that the ratio of the number of radicals Y to the number of blocks A is at least equal to 2, the relative proportions of the different compounds $Z(CH_2X)_j$ being such that the ratio of the number of radicals X to the number of blocks Z is at least 2.

14. Process according to claim 13, characterized in that the leaving group X is a halide or a sulfate $R'OSO_3$ or a sulfonate $R'SO_3$, in which R' denotes an organic group, halogenated or otherwise, containing fewer than 20 carbon atoms.

15. Process according to claim 14, characterized in that R' is chosen from alkyl groups, aryl groups and alkylaryl groups.

16. Process according to claim 13, characterized in that the base B is chosen from alkali or alkaline-earth metal hydroxides, quaternary ammonium hydroxides, in particular anion exchange resins containing benzyltrialkylammonium groups in the form of hydroxide, alkali or alkaline-earth metal hydrides, amides and alkoxides, and nonnucleophilic organic bases which are difficult to quaternize.

17. Process according to claim 13, characterized in that a proportion of the molecules $Z(CH_2X)_j$ is replaced with molecules $Z'(CH_2X)_j$, in which Z' does not have any bonds which are reactive in radical crosslinking with a given radical initiator, the relative proportions of the different $Z(CH_2X)_j$ and $Z'(CH2X)_j$, being such that the ratio of the number of radicals X to the number of blocks Z and Z' is at least 2.

18. Process according to either of claims 13 and 17, characterized in that the radical Z and/or the radical Z' have functional groups capable of increasing the reactivity of the leaving groups X towards nucleophilic substitutions.

* * * * *